Patented Dec. 23, 1930

1,786,094

UNITED STATES PATENT OFFICE

CARL TAUBE, OF LEVERKUSEN-ON-THE-RHINE, GERMANY, ASSIGNOR TO WINTHROP CHEMICAL COMPANY, INC., OF NEW YORK, N. Y., A CORPORATION OF NEW YORK

MANUFACTURE OF PHENYLMERCURIC ACETATE

No Drawing. Application filed August 1, 1929, Serial No. 382,839, and in Germany August 8, 1928.

The present invention relates to improvements in the manufacture of phenylmercuric acetate.

The mercurization of aromatic hydrocarbons is described in the literature. Dimroth (Berichte der Deutschen Chemischen Gesellschaft, volume 31, page 2154, and volume 32, page 759) treated, for example, benzene with mercuric acetate at 110° C. and thus obtained phenyl mercuric acetate. More recently Maynard (Journal of the American Chemical Society, volume 46 (1924), page 1510) has shown that with the addition of acid fixing agents (ethyl alcohol) benzene is mercurized up to 80% by heating for 55 hours with mercuric acetate under a reflux condenser.

In adapting these experiments to working on a large scale, Dimroth's process displays the disadvantage that it necessitates working in pressure vessels, which must be stable to inorganic mercury salts and to the glacial acetic acid formed by the reaction, whilst Maynard's process has the disadvantage that it requires an extraordinarily long time.

In accordance with the present invention, both disadvantages are obviated by carrying out the reaction, that means heating the mixture of benzene to be mercurized with mercuric acetate, in the presence of a high-boiling inert solvent, boiling above 150° C., for example, nitrobenzene and 1.2-dichlorobenzene. Such quantity of the solvent is added to the benzene as to raise the boiling point of the mixture to about 120–140° C., at which temperatures the solvent is not attacked by the mercuric acetate. The quantity of the solvent to be added is determined by boiling point tests carried out with benzene containing various amounts of the solvent. The reaction is complete when ionized mercury cannot be detected any more, generally after several hours. The reaction mass is filtered and the clear solution is concentrated in vacuo.

The invention is illustrated by the following examples, without being limited thereto:

*Example 1.*—40 parts by weight of mercuric acetate, 90 parts by weight of benzene and 400 parts by weight of nitrobenzene are heated to 130–135° C. (internal temperature) with stirring on a reflux condenser. After three hours the reaction is complete, that is to say, ionized mercury is no longer present. The solution is filtered hot and the volatile constituents are distilled off in vacuo. The residue solidifies on cooling in crystalline form. On recrystallization from alcohol the product is obtained in colorless leaflets, melting at 149° C.

*Example 2.*—20 parts by weight of mercuric acetate are heated for one hour to gentle boiling on a reflux condenser with 200 parts by weight of 1.2-dichlorobenzene and 40 parts by volume of benzene. The temperature of the boiling mixture is 128–130° C. When the reaction is complete (caustic soda lye no longer causes precipitation of the oxide) the reaction mass is cooled, filtered and the clear solution is concentrated by evaporation in vacuo. The residue solidifies on cooling to a crystalline mass. When recrystallized from water the phenyl mercuric acetate is obtained in colorless prisms, melting at 148° C.

I claim:

1. The process which comprises boiling mercury acetate for several hours in benzene to which such a quantity of a high-boiling inert organic solvent of a boiling point of at least 150° C. has been added that the boiling point of the mixture is raised to about 120–140° C.

2. The process which comprises boiling mercury acetate for several hours in benzene to which such a quantity of a solvent of the group consisting of nitrobenzene and 1.2-dichlorobenzene has been added that the boiling point is raised to about 120–140° C.

3. The process which comprises heating for several hours 40 parts by weight of mercuric acetate in a mixture of 90 parts by weight of benzene and 400 parts by weight of nitrobenzene to 130–135° C.

In testimony whereof, I affix my signature.

CARL TAUBE. [L. S.]